United States Patent
Kumar et al.

(10) Patent No.: US 9,218,388 B1
(45) Date of Patent: Dec. 22, 2015

(54) DECLARATIVE CLUSTER MANAGEMENT

(75) Inventors: Ashwin Kumar, San Carlos, CA (US); Cimarron Taylor, Oakland, CA (US)

(73) Assignee: EMC Corporation, Hopkinton, MA (US)

( * ) Notice: Subject to any disclaimer, the term of this patent is extended or adjusted under 35 U.S.C. 154(b) by 739 days.

(21) Appl. No.: 13/534,956

(22) Filed: Jun. 27, 2012

(51) Int. Cl.
*G06F 17/30* (2006.01)

(52) U.S. Cl.
CPC .... *G06F 17/30377* (2013.01); *G06F 17/30554* (2013.01); *G06F 17/30572* (2013.01)

(58) Field of Classification Search
CPC ............... G06F 17/30371; G06F 17/30377; G06F 17/30604; G06F 17/30463; G06F 17/30348; G06F 17/30359; G06F 17/30864; G06F 17/30345; G06F 17/30067; G06F 17/30283; G06F 3/0841; G06F 3/0629; G06F 3/0653; G06F 11/323; G06F 11/3006; G06F 11/3065; G06F 11/321; G06F 9/444; G06F 9/466; G06F 2201/86
USPC ...................... 714/1–824; 707/600, 607–608; 715/700–867
See application file for complete search history.

(56) References Cited

U.S. PATENT DOCUMENTS

| | | | | |
|---|---|---|---|---|
| 7,949,991 | B1 * | 5/2011 | Kuwamoto | G06F 9/444 717/100 |
| 8,001,469 | B2 * | 8/2011 | Weng | G06F 8/30 715/708 |
| 8,122,368 | B2 * | 2/2012 | Chakra et al. | 715/772 |
| 8,204,848 | B2 * | 6/2012 | Sinha | G06F 17/30306 707/600 |
| 8,204,854 | B2 * | 6/2012 | Ahmed et al. | 707/610 |
| 8,280,884 | B2 * | 10/2012 | Greenfield | G06F 17/30864 707/721 |
| 8,881,039 | B2 * | 11/2014 | Hammack | G06T 3/0012 715/764 |
| 8,898,523 | B2 * | 11/2014 | Vecera et al. | 714/32 |
| 2008/0256474 | A1 * | 10/2008 | Chakra | G06F 3/0481 715/772 |
| 2009/0119586 | A1 * | 5/2009 | Weng | G06Q 10/06 715/705 |
| 2009/0281862 | A1 * | 11/2009 | Conescu | G06Q 10/0633 705/7.27 |

* cited by examiner

*Primary Examiner* — Michelle Owyang
(74) *Attorney, Agent, or Firm* — Van Pelt, Yi & James LLP

(57) ABSTRACT

An indication associated with an operation is received where the operation includes a mid-operation state and a device associated with the mid-operation state. In response to receiving the indication, the operation is processed using a declarative primitive to obtain metadata associated with one or more of the following: the device or the mid-operation state. The metadata is displayed.

18 Claims, 13 Drawing Sheets

```
kumara64-$ start_database.py --explain
20120202:14:38:18:start_database:localhost:kumara64-[INFO]: Outputting Statement of Work...
20120202:14:38:18:start_database:localhost:kumara64-[INFO]: 1. On All Nodes
20120202:14:38:18:start_database:localhost:kumara64-[INFO]:    1.1 StartOneDatabase
20120202:14:38:18:start_database:localhost:kumara64-[INFO]:    1.2 VerifyStartupOneDatabase
20120202:14:38:18:start_database:localhost:kumara64-[INFO]: 2. On Standby
20120202:14:38:18:start_database:localhost:kumara64-[INFO]:    2.1 SignalCompletion
20120202:14:38:19:start_database:localhost:kumara64-[INFO]: 3. On Master
20120202:14:38:19:start_database:localhost:kumara64-[INFO]:    3.1 SignalCompletion
20120202:14:38:19:start_database:localhost:kumara64-[INFO]: 4. CommenceTransformation
20120202:14:38:19:start_database:localhost:kumara64-[INFO]: 5. CleanupStartingTransaction
```

```
kumara64-$ start_database.py
20120202:14:38:18:start_database:localhost:kumara64-[DEBUG]: > 1. On All Nodes
20120202:14:38:18:start_database:localhost:kumara64-[WARN]: Network latency is high.
20120202:14:38:18:start_database:localhost:kumara64-[DEBUG]: >> 1.1 StartOneDatabase
20120202:14:38:18:start_database:localhost:kumara64-[INFO]: Dispatched command to start cluster
20120202:14:38:18:start_database:localhost:kumara64-[DEBUG]: >> 1.2 VerifyStartupOneDatabase
```

502

```
kumara64-$ start_database.py
[1. On All Nodes] ========>                                                                    [5%]
[1.2 VerifyStartupOneDatabase] ========>                                                      [20%]
```

```
kumara64-$ start_database.py
20120202:14:38:18:start_database:localhost:kumara64-[DEBUG]: > 1. On All Nodes
...
20120202:14:38:18:start_database:localhost:kumara64-[DEBUG]: >>> 2.5.3 Rewrite Catalog
20120202:14:38:18:start_database:localhost:kumara64-[FATAL]:  Encountered unexpected catalog!
20120202:14:38:18:start_database:localhost:kumara64-[DEBUG]: Dumping cluster management state:
1. On All Nodes
        1.1 StartOneDatabase
        1.2 VerifyStartupOneDatabase
2. On Standby
        2.1 SignalCompletion
        ...
        2.5.3 Rewrite Catalog
```

FIG. 6

DECLARATIVE CLUSTER MANAGEMENT

BACKGROUND OF THE INVENTION

Databases come in a variety of sizes. Some systems, such as shared-nothing, massively parallel processing (MPP) systems, store massive amounts of information, for example on the order of terabytes or petabytes. For owners of these databases, it is often very important that these databases be operational at full capacity. Downtime or even slower response times may be unacceptable. As a result, it is important that operations which are performed on these systems, such as management operations (e.g., to migrate a database to new hardware or update software) or access operations (e.g., to write data to the database), are well understood and/or do not cause the system to crash or slow down at inconvenient times. It would be desirable if systems were able to provide services and/or tools which made these operations easier to manage and/or easier to understand. For example, such services and/or tools may be used by developers (e.g., who are responsible for creating and/or maintaining operations performed on a database), or by users of the operations (e.g., database administrators who manage a database).

BRIEF DESCRIPTION OF THE DRAWINGS

Various embodiments of the invention are disclosed in the following detailed description and the accompanying drawings.

FIG. 4 is a diagram showing an embodiment of a command line interface which provides a planning service.

FIG. 5 is a diagram showing an embodiment of a command line interface which performs run time reporting.

FIG. 6 is a diagram showing an embodiment of a command line interface which provides failure reporting.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
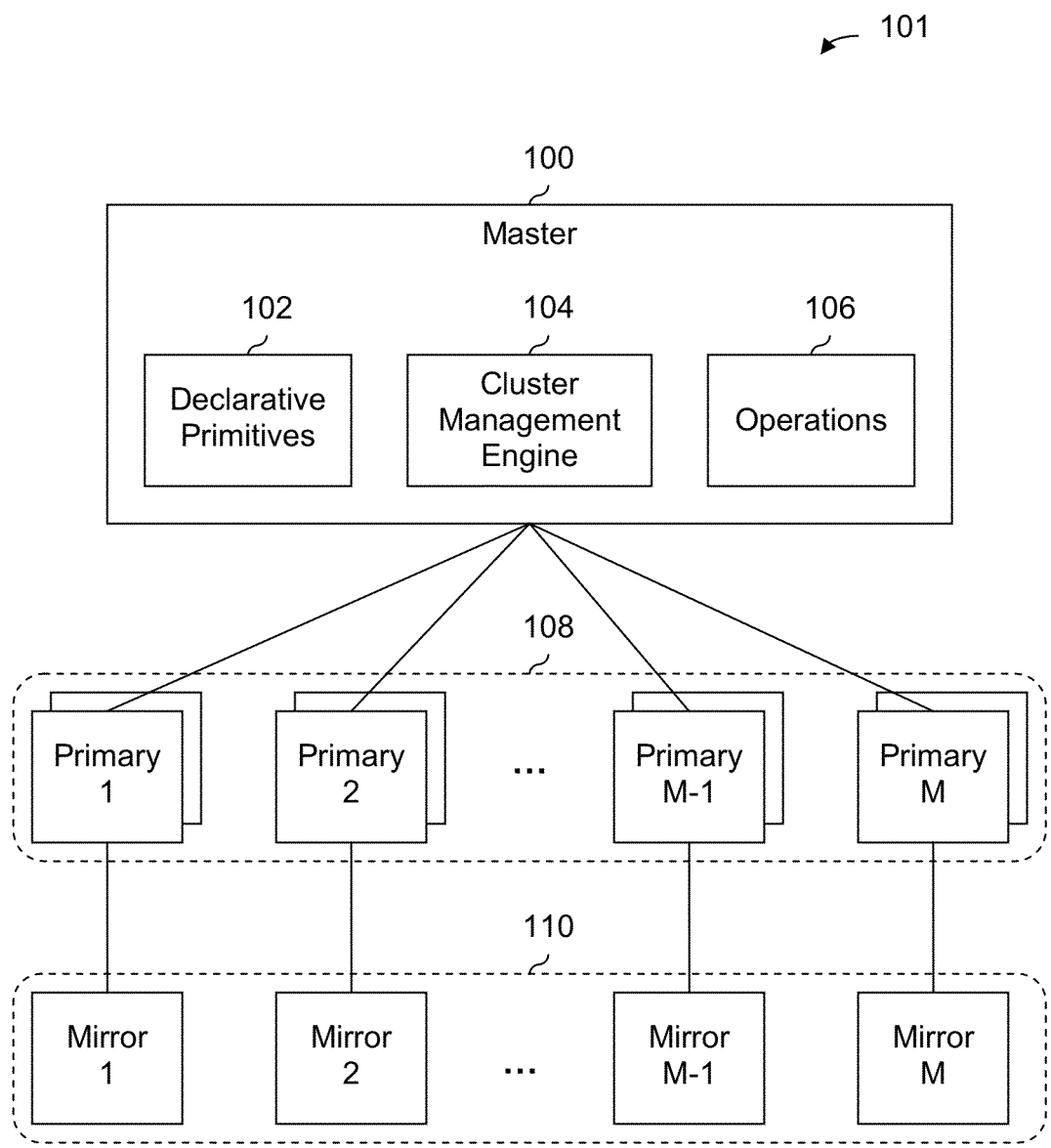
FIG. 1 is a diagram illustrating an embodiment of a distributed system which includes declarative type operations.

FIG. 1 is a diagram illustrating an embodiment of a distributed system which includes declarative type operations. In the example shown, distributed system 101 includes master 100, primaries 108, and mirrors 110. The information managed by distributed system 101 (sometimes referred to as user information or payload information) is stored on primaries 108 which are coupled to master 100. The information stored on primaries 108 may be, for example, transaction and inventory information for a retailer, patient medical records for a hospital, or customer account information for a financial services company. For clarity, some elements or components not directly related to the technique described herein may not be shown. For example, master 100 may include metadata (such as state information) about the state of mirrors 108, the state of the master, or other components in distributed system 101.

Mirrors 110 are backups of primaries 108 and mirror the state of primaries 108 (e.g., by performing duplicate instructions on mirrors 110 so that the states of the two sets are the same). Should a primary go down (e.g., primary 1), the corresponding mirror (e.g., mirror 1) becomes the new primary (e.g., responding to instructions from master 100). In some embodiments, a distributed system does not include mirrors.

Master 100 includes declarative primitives 102, cluster management engine 104, and operations 106. Cluster management engine 104 performs operations 106 (e.g., in response to a user instruction) using declarative primitives 102. In this example, things like threads, pools, and ports are managed by cluster management engine 104. These are the portions of "glue" code which operations 106 would otherwise have to handle themselves in order to manage nested operations. In some embodiments, an instruction or indication is received from a user and cluster management engine 104 performs the specified operation in response to the indication. Some operations stored in 106 relate to management of the system, such as editing configuration files, installing applications, measuring performance, health monitoring, provisioning infrastructure (e.g., to satisfy a service-level agreement), adding new nodes (e.g., to increase throughput), or performing rebalancing (e.g., to ensure high availability). Other operations in 106 are data related operations, for example to search for a certain value, analyze stored content, and so on.

Operations 106 are described at a declarative level or using declarative descriptions (e.g., as opposed to imperative code or issues). Put another way, an operation describes goals or states (e.g., states of one or more devices in distributed system 101) through which some or all devices in a distributed system will progress during that operation (i.e., mid-operation). An exemplary operation 106 may be to store information on a primary; imperative details or issues such as opening a communication channel from master 100 to the relevant primary, creating a new data object on that primary to store the new data, and so on may not be visible or described (at least from the top level of the declarative type operation). Other examples of imperative details which may be hidden or abstracted out in an operation include building a parallel pool of threads, setting up ports, opening protocols, and/or managing sockets. An example of a declarative type operation is described in further detail below.

By including mid-operation goals or states, operations 106 may provide metadata which may not have previously existed in the system. For example, operations may have previously existed in a system as a large jumble of imperative code. With imperative "spaghetti code," it is difficult to tell (e.g., in the middle of performing an operation) what task or state the system is at, if the overall operation is stuck, if the operation is close to finishing, etc. In contrast, because operations 106 include goals or states, the system has (as an example) metadata about what states the system will go through during the operation (e.g., prior to the operation being performed), in what sequence those states will occur, and so on. This provides a number of new and useful features and benefits, some examples of which are described in further detail below.

Declarative primitives 102 are put forth by a declarative language for performing operations 106. In various embodiments, declarative primitives 102 permit operations to be performed in a remote, serial, parallel, nested, or conditional manner, including any combination thereof. An example of a remote expression included in an operation which a declarative primitive is able to process is: "On Primary 1, Run Operation A". As shown in the previous example, declarative primitives are able to understand the concept of device(s) on which to perform an operation (e.g., Primary 1); Primary 1 is part of the target system. Two examples of serial expressions are "Run Operation A Then Run Operation B" and "Run Operation A; Run Operation B". An example of a parallel expression is "Run Operation A and Operation B". In some embodiments, declarative primitives 102 permit operations 106 to be nested (e.g., Operation A includes just Operations B and C, and actual operations of Operation A are wholly described in Operations B and C). An example of a conditional expression is "When Receive Completion Signal Run Operation A". These are some examples; the technique is not limited to these specific examples.

In various embodiments, various (e.g., markup) languages are used to provide declarative primitives 102. In some embodiments, JavaScript Object Notation (JSON) is used. In some embodiments, YAML (one embodiment of JSON) is used. Other languages which may be used include XML and SDL. In some embodiments, a custom, text-based markup format is used.

In some embodiments, distributed system 101 is a shared-nothing, massively parallel processing (MPP) database, such as EMC's Greenplum Database. In some such systems, primaries 108 and/or mirrors 110 are implemented using large clusters of powerful devices, which may be relatively inexpensive and/or commodity-like. A MPP system permits large amount of information to be stored and managed, for example on the order of terabytes or petabytes. Other types of systems, such as relational database management system (RDBMS), may not be able to manage such large amounts of information with sufficient performance. For example, although a RDBMS system may technically be able to store terabytes of data, the amount of time required to perform operations on the information may be too slow to be useful. In at least some cases, downtime and system performance is very important. For example, a financial services company may require real-time access to the information stored in distributed system 101 in order to perform customer transactions. A down system (which would prevent the company from performing customer transactions) or slow performance (which might affect a share price and/or number of shares exchanged) would be extremely undesirable.

Although some of the example systems and example benefits described herein relate to distributed systems, the technique is not necessarily limited to distributed systems. In some embodiments, the technique is employed to manage single device, non-distributed systems.

Figure 2:
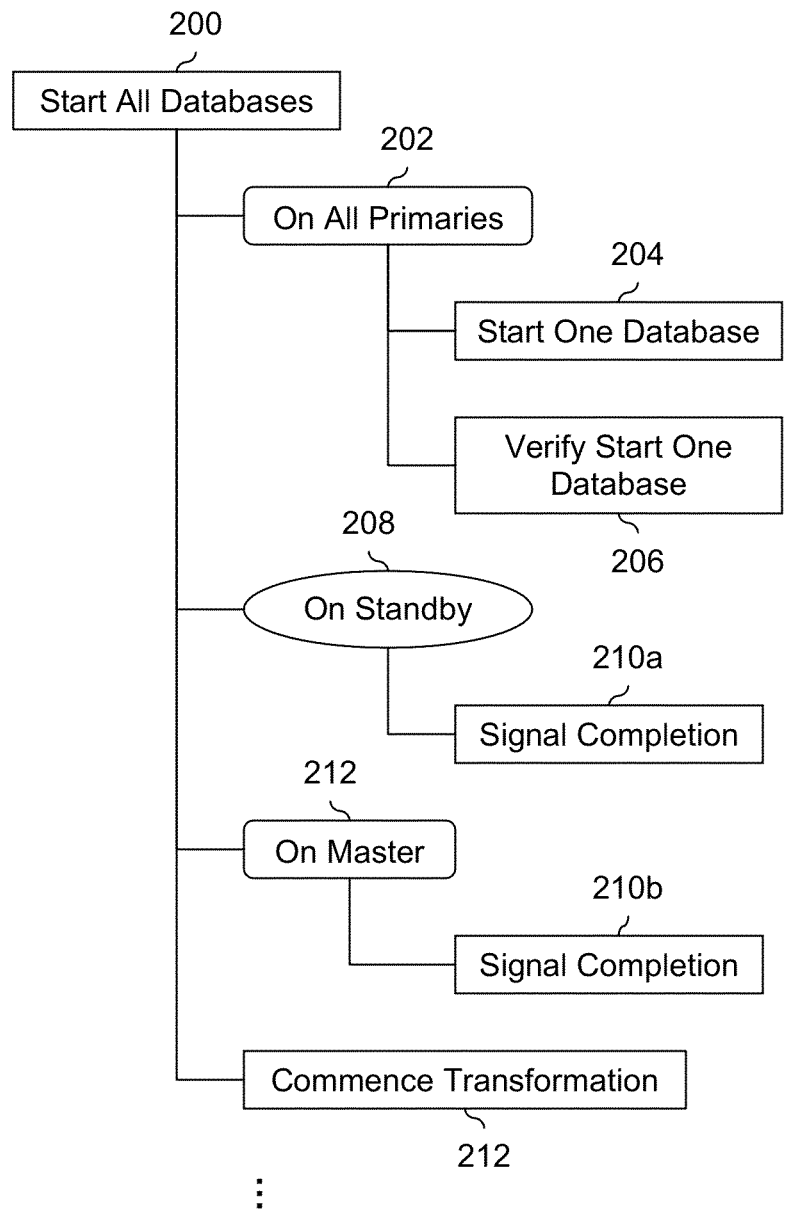
FIG. 2 is a diagram showing an embodiment of a declarative type operation.

FIG. 2 is a diagram showing an embodiment of a declarative type operation. In the example shown, operation 200 is associated with starting a distributed system (such as distributed system 101 in FIG. 1) and is called start all databases. In the example shown, operation 200 includes other operations (sometimes referred to as sub-operations or mid-process states and shown with rectangles), device(s) on which an operation is performed (shown with rounded rectangles), and conditions (shown with ovals). In some embodiments, operation component type (e.g., sub-operation, device, or condition) is indicating using markup so that a system processing the operation is able to identify which components are sub-operations, which are conditions, and so on.

On all primaries (200), the sub-operations start one database (202) and verify start one database (204) are performed serially. For example, on Primary 1 in FIG. 1, the operation start one database (202) is performed; when that operation is completed, verify start one database (204) is performed on Primary 1. In this example, on all primaries (200) has the property that the operation(s) performed on one primary do not interfere with or depend upon operations(s) performed on another primary. For example, verify start one database (206) on Primary 1 does not depend upon start one database (204) finishing on Primary 2. Conversely, in some embodiments, an operation may wait for all devices to finish the same (sub-) operation.

Next, on standby (208), signal completion (210a) is performed. For example, verify start one database 206 may output a standby signal if successfully completed and condition 208 causes signal completion 210a to be performed only when start one database 204 and verify start one database 206 have been successfully completed on all primaries.

Operation 200 then includes on master 212, signal completion 210b. In this example, signal completion 210a (performed on standby 208) and signal completion 210b (performed on master 212) are the same operation. As shown in this example, an operation may be reused and/or performed on different devices.

Next, commence transformation 214 is performed. As shown by the commence transformation operation, it is not necessary for a sub-operation to specify a device on which the operation is performed (e.g., on master 212) or a conditional expression (e.g., on standby 208).

In the example shown, components 202-212 of operation 200 are functional, intuitive components similar to what a programmer would describe if explaining the operation to another person and/or describing the operation in a technology or protocol agnostic manner. The programmer would describe affected devices at various mid-operation states. Low level and/or technology specific tasks like creating and managing threads, pools, ports, and protocols are not mentioned or described in the names of components 202-212 of operation 200 and are hidden or abstracted out from the view shown herein.

In some embodiments, a declarative type operation includes (e.g., additional) metadata not related to the functionality of the declarative type operation. For example, in the code, an operation may be called SrtAllDbs (e.g., and if included as a sub-operation in another operation it is referred to as such) but the programmer may include additional metadata to indicate that the name of the operation to be presented to a user (e.g., in a graphical or command line interface) should be the more readable "Start All Databases". The user may be programmer responsible for updating the operation, or a user who runs the operation on a target system. Some other examples of (additional) metadata which may be included in an operation include: historic run times or recommendations/advice (e.g., debugging advice if the operation failed, planning advice before the operation is run, affected devices, etc.). In some embodiments, this (additional) metadata is provided or specified by a programmer.

Leaf operations (such as start one database 204 and verify start one database 206) do not, by definition, include other operations. In one example of a leaf operation, the programmer responsible for coding verify start one database 206 has decided to test that the database in question has been successfully started by testing all functions related to the database which was started. For simplicity, suppose adding a data object in the database, deleting a data object in the database, writing to the database, reading from the database, changing a property of the database, and reading a property of the database comprise the entire set of database related, data and management operations. Operation 206 in one example goes through all possible operations and confirms that all of the functions are operating, for example by setting a data value or property of the database to a known value, reading back the value/property, and confirming that the returned value is the expected value. In various embodiments, the contents of a leaf operation are performed in a command line interface and/or include functions exposed by an application programming interface (API) provided by the distributed system.

In various embodiments, a variety of (e.g., markup) languages may be used to implement operations. Some examples include Python and YAML.

Figure 3:
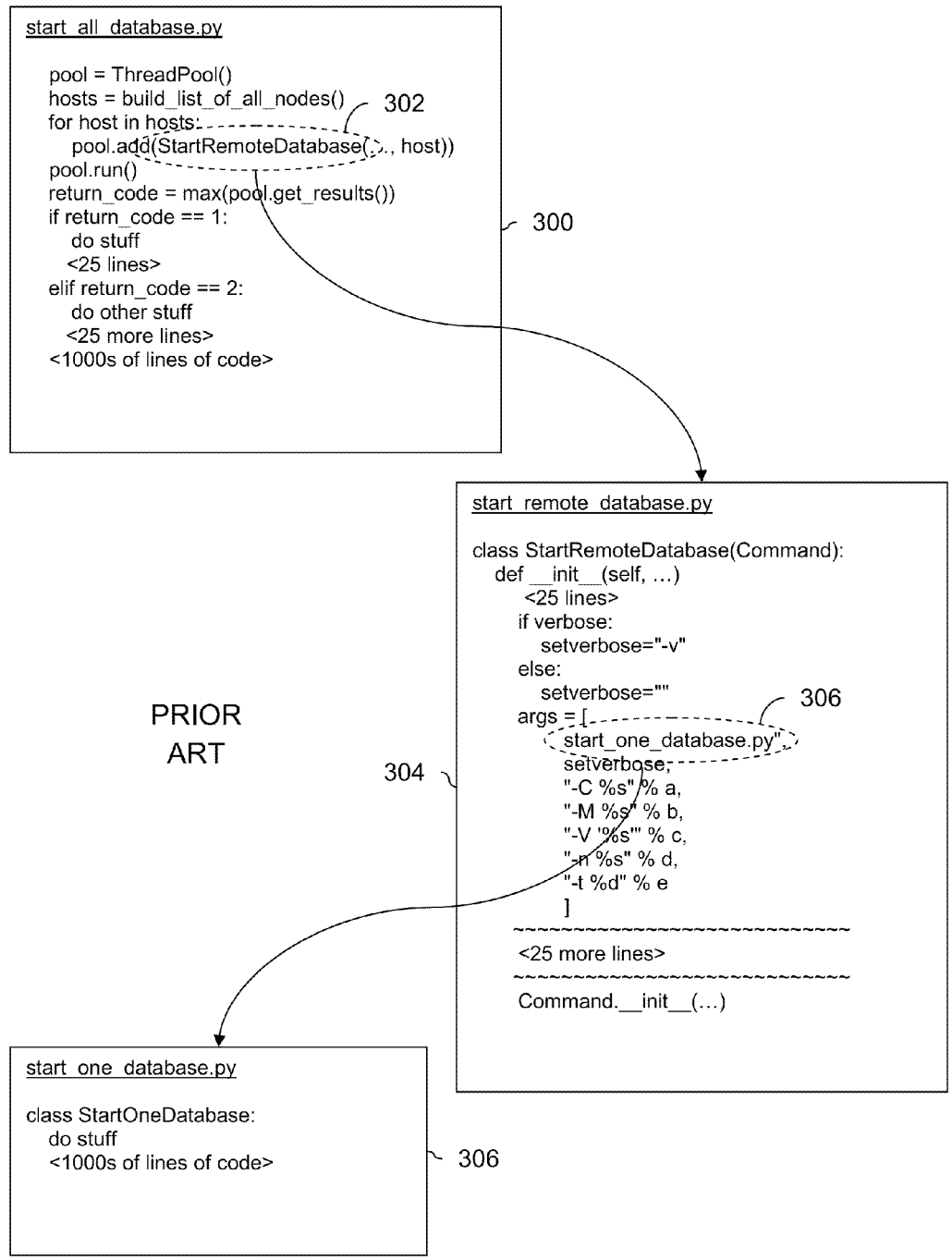
FIG. 3 is a diagram showing an example of an imperatively coded operation to start all databases.

FIG. 3 is a diagram showing an example of an imperatively coded operation to start all databases. FIG. 3 is an imperative example corresponding to the declarative example shown in FIG. 2. In this example, file 300 (start_all_database.py) begins by creating a thread pool (i.e., "pool=ThreadPool( )") and creating a list of all primaries (i.e., "hosts=build_list_of_all_nodes( )"). The overarching task is to start all databases; creating a thread pool and creating a list of all primaries are annoying impediments for the developer. Also, the developer has to manage return codes (i.e., "if return_code==1: do stuff" and "elif return_code==2: do other stuff"). Return codes are non-intuitive and may create confusion if the programmer mixes up return codes.

StartRemoteDatabase (302) is included in file 304 (start_remote_database.py). The code in file 304 permits file 306 (start_one_database.py) to be invoked remotely through an secure shell (SSH) call. File 306 includes the actual code to start_one_database; the primary purpose of file 304 is to be "glue" code connecting file 306 (start_one_database.py) and StartRemoteDatabase 302. Similar to creation of a thread pool and creating a list of primaries in file 300, this "glue" code has no direct relevance to the overarching job of starting a database and is an annoyance.

One benefit to declarative type operations (e.g., including data related operations and management related operations distributed system) is that management of a code base is simplified and/or more manageable for the programmers compared to a code base which is implemented using imperative code. In FIG. 3, for example, a programmer has to open up 3 different files to see all of the code, and the functionality of the operation (i.e., to start all databases) is buried amongst code which creates thread pools and handles return codes. The division of the code amongst files 300, 302, and 304 also does not reflect intuitive, high level functional tasks. In contrast, the example of FIG. 3 may be contained in the same file and is human readable and intuitive. A user reading operation 300 knows what sub-operations are included in operation 200, on what devices/conditions those sub-operations occur, in what sequence the sub-operations occur, and so on. Declarative type operations also permit and encourage modularity. Note, for example, how operation 200 is broken up into intuitive modules as opposed to a jumble of code.

Another benefit to a declarative type operation is that it is deconstructed or divided into a hierarchy or structure with components (see, e.g., the structure of operation 200 in FIG. 2 with a plurality of components) which permits a system to have metadata or state information about the operation. In one example, a system is able to parse the hierarchy shown in operation 200 (e.g., without the operation actually being performed) and internally build a sequence of states through which the system will progress. In some embodiments, coding a declarative type operation such as operation 200 is sufficient for a system to obtain metadata or state information and it is not necessary to specify additional and/or dedicated metadata to impart state information. In some embodiments, this metadata or state information is used to support planning services (e.g., before and/or without actually performing an operation) or reporting services while the operation is being performed, or failure related services in the event the operation fails.

In contrast, a system which intakes files 300, 302 and 304 is not able to build such a sequence of states. File 300, for example, contains thousands of lines of code, as does file 306, and there is no demarcation or division of distinct states or metadata about what is happening from a functional or high level point of view. As for file 304, even though it is much shorter than files 300 and 306, it has no relation to the functional or application-specific task of starting all databases (i.e., it is "glue" code). As such, it provides no insight into the start all databases operation (e.g., which could be used by a user interface to present information to a user).

Another benefit to declarative type operations is simplification and/or easier implementation of remote procedure calls (RPC), which is of particular concern in distributed systems. Cluster management engine 104 on master 100 in FIG. 1, for example, may want a certain operation to be performed on all of primaries 108. The imperatively coded example of FIG. 3 includes infrastructure and protocols for this in file 304 (i.e., start-remote-database.py). Without declarative type operations, RPCs require "glue" code to distill parameters into a command line string that can be SSH'd to a remote host. A declarative type operation, on the other hand, is a complete articulation of a task. By adhering to this protocol, anything that implements this API can be serialized for RPC easily, as is the case of operation 200 in FIG. 2. On all primaries 202 and on master 212 in operation 200 specify respectively for sub-operations 204/206 and 210b the devices on which the corresponding sub-operations are performed. Put another way, sub-operations 204, 206, and 210b (and also signal completion 210a, since 210a and 210b are essentially the same) are addressable, so that an operation can be addressed or directed to desired device(s).

Another benefit to declarative type operations may be observed prior to performance of an operation. The following figure shows an example of a command line interface which provides a planning service.

FIG. 4 is a diagram showing an embodiment of a command line interface which provides a planning service. In the example shown, a user enters "start_database.py --explain" in command line interface 400. In some embodiments, declarative type operation 200 from FIG. 2 is included in the file start_database.py (referred to in command line interface 400). In response to the input, the command line interface outputs a statement of work listing the components of the operation for the specified operation (e.g., "Outputting Statement of Work . . . 1. On All Nodes 1.1 StartOneDatabase 1.2 VerifyStartupOneDatabase 2. On Standby 2.1 SignalCompletion 3. On Master 3.1 SignalCompletion 4. CommenceTransformation 5. CleanupStartingTransaction"). Note that the operation to start all databases is not actually being executed; rather, the command line interface reports on the mid-operation states and related devices which would be affected if the operation were actually performed.

In some embodiments, as part of a planning process, a system takes into account a target system on which the operation is theoretically to be performed. In some cases, some sub-operations or mid-operation states are not applicable because they are not relevant or necessary for that particular target system. For example, if a system has no mirrors and some of the components of an operation relate to mirrors, then those components of the operation are removed from a statement of work presented. In some embodiments, a statement of work includes sub-operations which are not relevant to the target system, but they are grayed out or presenting in some other manner to indicate exist but they are not relevant for the target system.

As described above, it may be very important for some users to ensure that there is no system downtime or performance lag and planning features are therefore very important. With the imperatively coded operation in FIG. 3, planning may not be possible. For example, the statement of work in command line interface 400 would not be able to be returned using the imperatively coded operation in FIG. 3 (e.g., because there is no metadata included in the operation which can be presented to the user).

Other benefits to the system may be observed while an operation is running (i.e., at run time). The following figure describes one such embodiment.

FIG. 5 is a diagram showing an embodiment of a command line interface which performs run time reporting. In command line interface 500, a user begins the start all databases operation (e.g., shown in FIG. 2) by entering "start_database.py" (e.g., the name of the file which contains the operation). While performing the operation, command line interface 500 performs hierarchical logging by returning "1. On All Nodes", "1.1 StartOneDatabase", and "1.2 VerifyStartupOneDatabase" when the corresponding component in the operation is reached (i.e., in real time). In addition to displaying hierarchical logging information, warning messages (e.g., "Network latency is high.") and informative messages (e.g., "Dispatched command to start cluster") are also displayed.

Command line interface 502 shows another reporting embodiment. In this example, real-time process indicators are presented in command line interface 502. In the state shown therein, the start all databases operation is in the middle of the verify startup one database sub-operation, and completion percentages are shown for that sub-operation (i.e., "1. On All Nodes"), as well as the parent component (i.e., "1.2 VerifyStartupOneDatabase"). When the operation progresses to 2. On Standby, 2.1 SignalCompletion (not shown), command line interface 500 updates itself to replace "1. On All Nodes" and "1.2 VerifyStartupOneDatabase" with "2. On Standby" and "2.1 SignalCompletion" and updates the corresponding completion percentages. In shown herein, in some embodiments, run-time reporting is performed in real-time.

Some benefits to the system may be observed in the event an operation (e.g., start all databases) fails. The following figure describes one such embodiment.

FIG. 6 is a diagram showing an embodiment of a command line interface which provides failure reporting. In command line interface 600, the user initiates the start all databases operation by entering "start_database.py." Command line interface 600 performs hierarchical logging and returns "1. On All Nodes . . . 2.5.3 Rewrite Catalog". While rewriting the catalog, the system encounters an unexpected catalog (e.g., because an existing catalog was renamed or a new catalog was started by some other process) and user interface 600 reports this: "[FATAL]: Encountered unexpected catalog!" Command line interface 600 then reports on the state of the system: "Dumping cluster management state: 1. On All Nodes 1.1 StartOneDatabase 1.2 VerifyStartupOneDatabase 2. On Standby 2.1 SignalCompletion . . . 2.5.3 Rewrite Catalog."

With the imperatively coded operation in FIG. 3, the system would not be able to report what state the operation failed in. Note, for example, that StartOneDatabase in file 306 is on the order of thousands of line of code and while the system may know at what line of code failed, it may not know what intuitive task that line of code is associated with. In contrast, declarative type operation 200 in FIG. 2 is clearly divided into distinct states or goals. Thus, when declarative type operation 200 is performed, it is very clear what state a system was in when it failed. (This also permits hierarchical logging and/or real time process indicators in the middle of performing a declarative type operation.)

Although the exemplary interfaces described above are all command line interfaces, services or features which build off of declarative type operations are not limited to command line interfaces. The following figures show some exemplary graphical user interfaces which provide planning services, real time reporting while a declarative type operation is being performed, and failure reporting.

Figure 7:
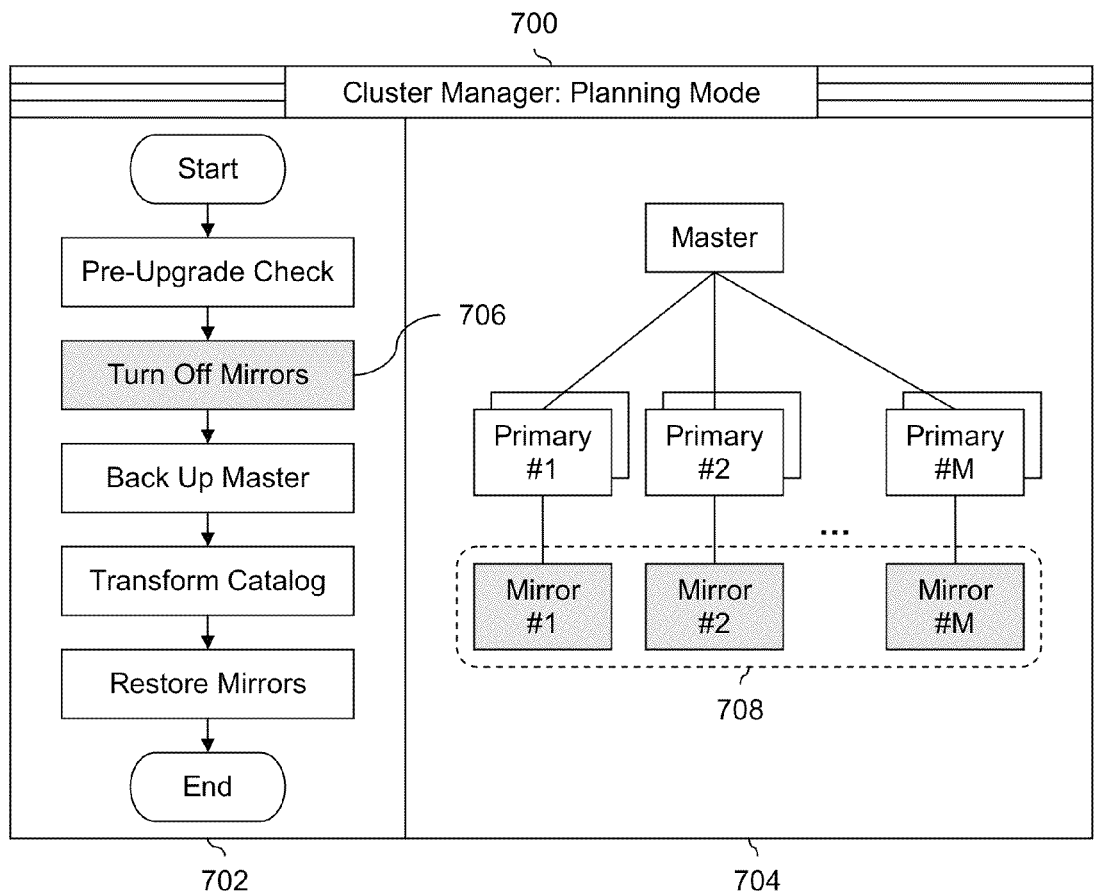
FIG. 7 is a diagram showing an embodiment of a graphical user interface which reports devices affected by a selected sub-operation in an operation.

FIG. 7 is a diagram showing an embodiment of a graphical user interface which reports devices affected by a selected sub-operation in an operation. In the example shown, graphical user interface 700 includes flow window 702 (which shows a selected operation to upgrade a database) and system window 704 (which shows a target system). The selected operation (i.e., upgrade database) includes the sequence: pre-upgrade check, turn off mirrors, back up master, transform catalog, and restore mirrors. Although flow window 702 does not show devices(s) on which an operation is performed (e.g., rounded rectangles 202/212 in FIG. 2) or conditionals (e.g., oval 208 in FIG. 2), the technique is not so limited.

Graphical user interface 700 is in a planning mode in which the interface reports which devices are affected by a selected sub-operation shown in flow window 702. The user has selected turn off mirrors 706 in flow window 702; in response to that selection, system window 704 highlights the affected devices. As shown in system window 704, the mirrors (708) in the distributed system are affected by turn off mirrors 706.

Referring back to operation 200 shown in FIG. 2, devices affected by an operation (shown as rounded rectangles in FIG. 2) may be indicated or flagged using markup and may thus be determined from the markup when the operation is parsed by a cluster management engine.

Although not shown herein, a graphical user interface may permit a user to specify the operation in flow window 702 and/or a target system in system window 704 (e.g., because there may be multiple systems under the control of the user).

Figure 8:
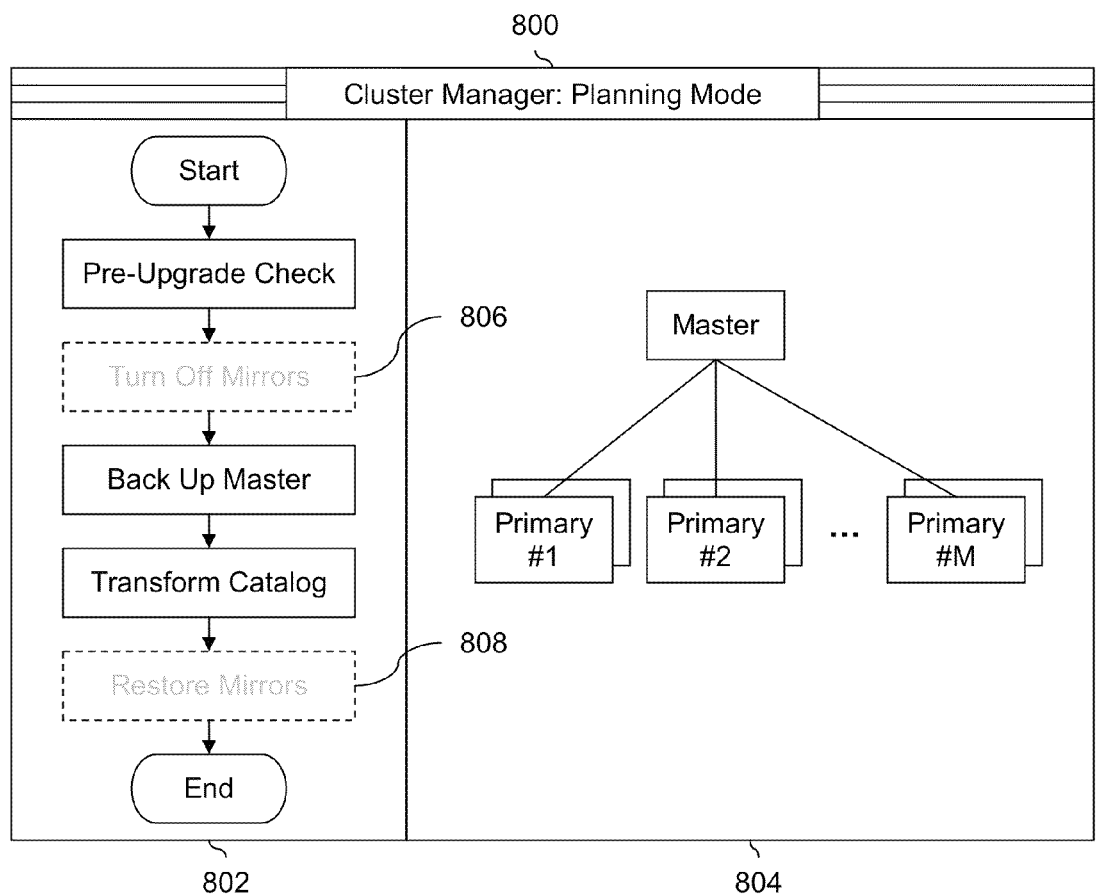
FIG. 8 is a diagram showing an embodiment of a graphical user interface which reports which sub-operations in an operation are not applicable for the target system.

FIG. 8 is a diagram showing an embodiment of a graphical user interface which reports which sub-operations in an operation are not applicable for the target system. In the example shown, graphical user interface 800 is in a planning mode. As shown in system window 804, the target system contains no mirrors. As a result, turn off mirrors 806 and restore mirrors 808 are grayed out and have dashed borders in flow window 802 to indicate they are not applicable for this particular target system.

Figure 9:
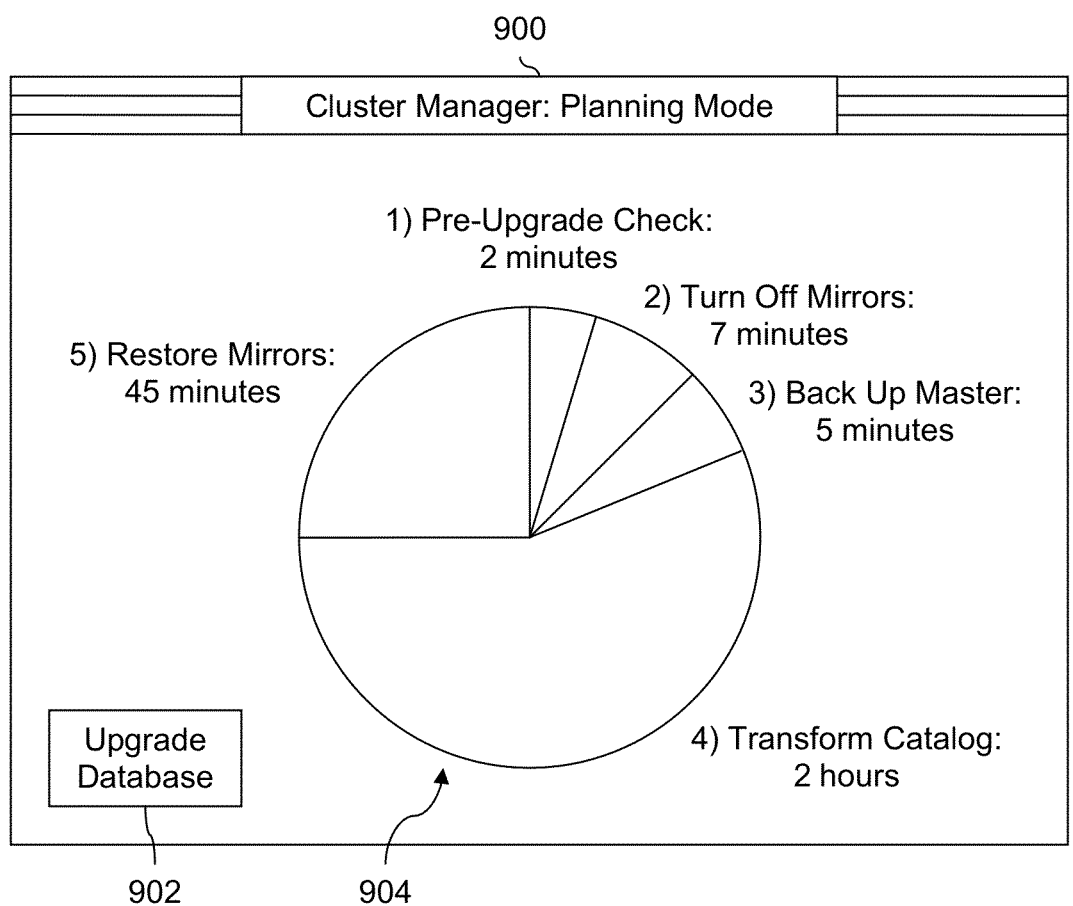
FIG. 9 is a diagram showing an embodiment of a graphical user interface which shows a pie chart of expected times for sub-operations of an operation.

FIG. 9 is a diagram showing an embodiment of a graphical user interface which shows a pie chart of expected times for sub-operations of an operation. In the example shown, graphical user interface 900 is in a planning mode and is reporting on an operation called upgrade database (902). Graphical user interface 900 includes pie chart 904 showing expected times for each sub-operation in the upgrade database operation. In some embodiments, a system stores expected times and retrieves them when needed. Historic times may be obtained from other systems (e.g., if the operation has never been performed on the target system) or from previously performing the operation on the target system. In some embodiments, historic times for different configurations (e.g., mirrors versus no mirrors, hundreds versus thousands of primaries, terabytes versus petabytes of data, etc.) are collected and stored and the appropriate historic information is returned based on the closest configuration to the target system.

Figure 10:
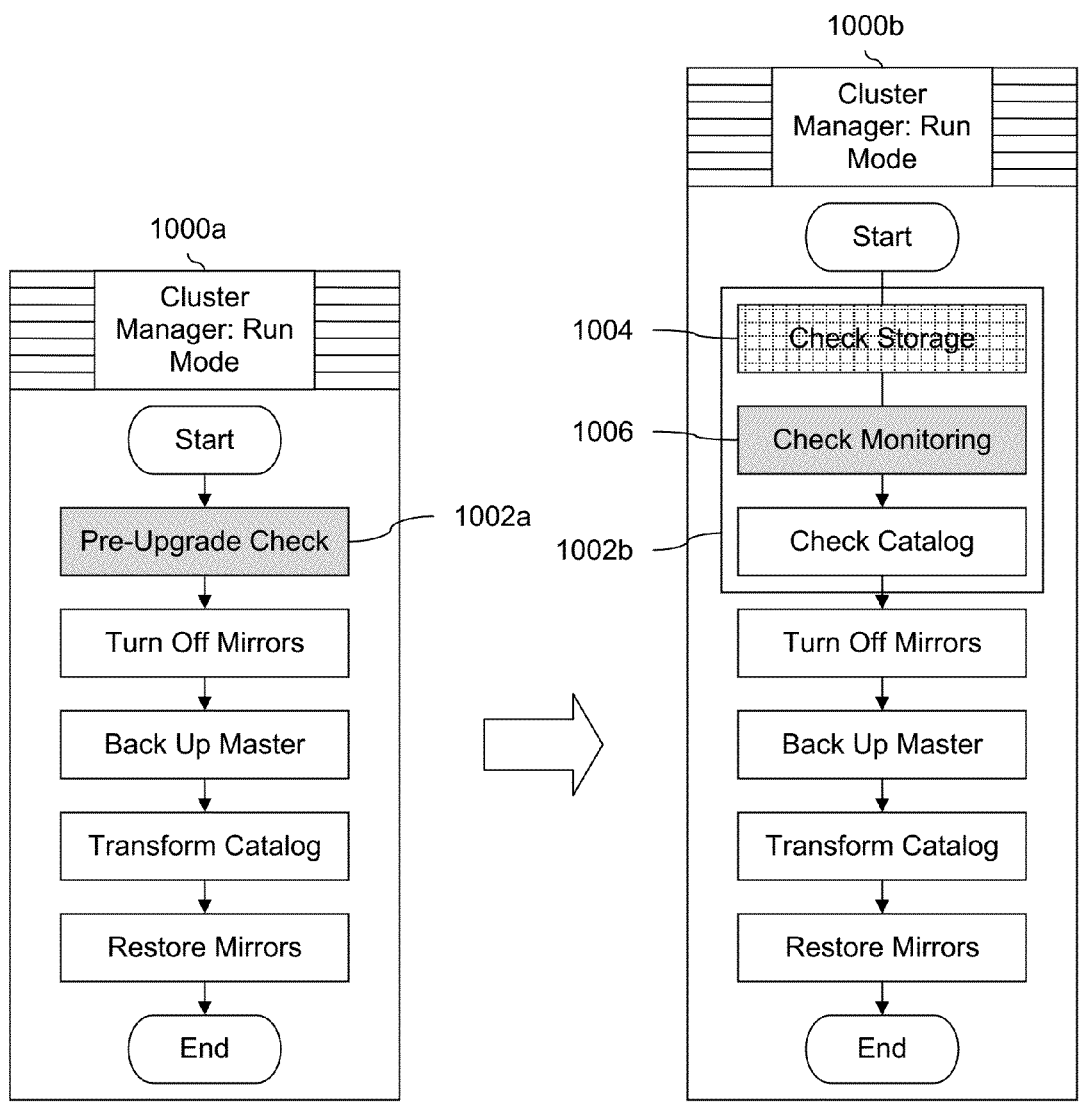
FIG. 10 is a diagram showing an embodiment of a graphical user interface which reports on nested sub-operations during run time.

FIG. 10 is a diagram showing an embodiment of a graphical user interface which reports on nested sub-operations during run time. In the example shown, graphical user interface 1000a is in a run mode, where an operation called upgrade database is being performed. Graphical user interface 1000a indicates that the sub-operation pre-upgrade check 1002a is being performed by highlighting that sub-operation. A user double clicks on pre-upgrade check 1002a, and in response graphical user interface 1000b is presented where the sub-operations in pre-upgrade check 1002b are broken out. Check storage 1004 has completed and this is indicated by a grid over check storage 1004. Check monitoring 1006 is currently being performed and this is indicated using a highlight. As the upgrade database operation is performed, graphical user interfaces 1000a and 1000b are updated in real time.

In some embodiments, a graphical user interface does not reveal further details about a sub-operation if it is a leaf (e.g., double clicking on a leaf would not cause corresponding code to be displayed). For example, a user interface may be directed towards planning and/or run time services, not development services. In some embodiments, the contents (e.g., code and/or any additional metadata) of a leaf are displayed depending upon the role of a user. For example, a developer may have his/her permissions set so that (s)he can see the code. In contrast, the permissions for a database manager (who is primarily interested in running the operation and, prior to that, planning for the operation) may not permit that.

Figure 11:
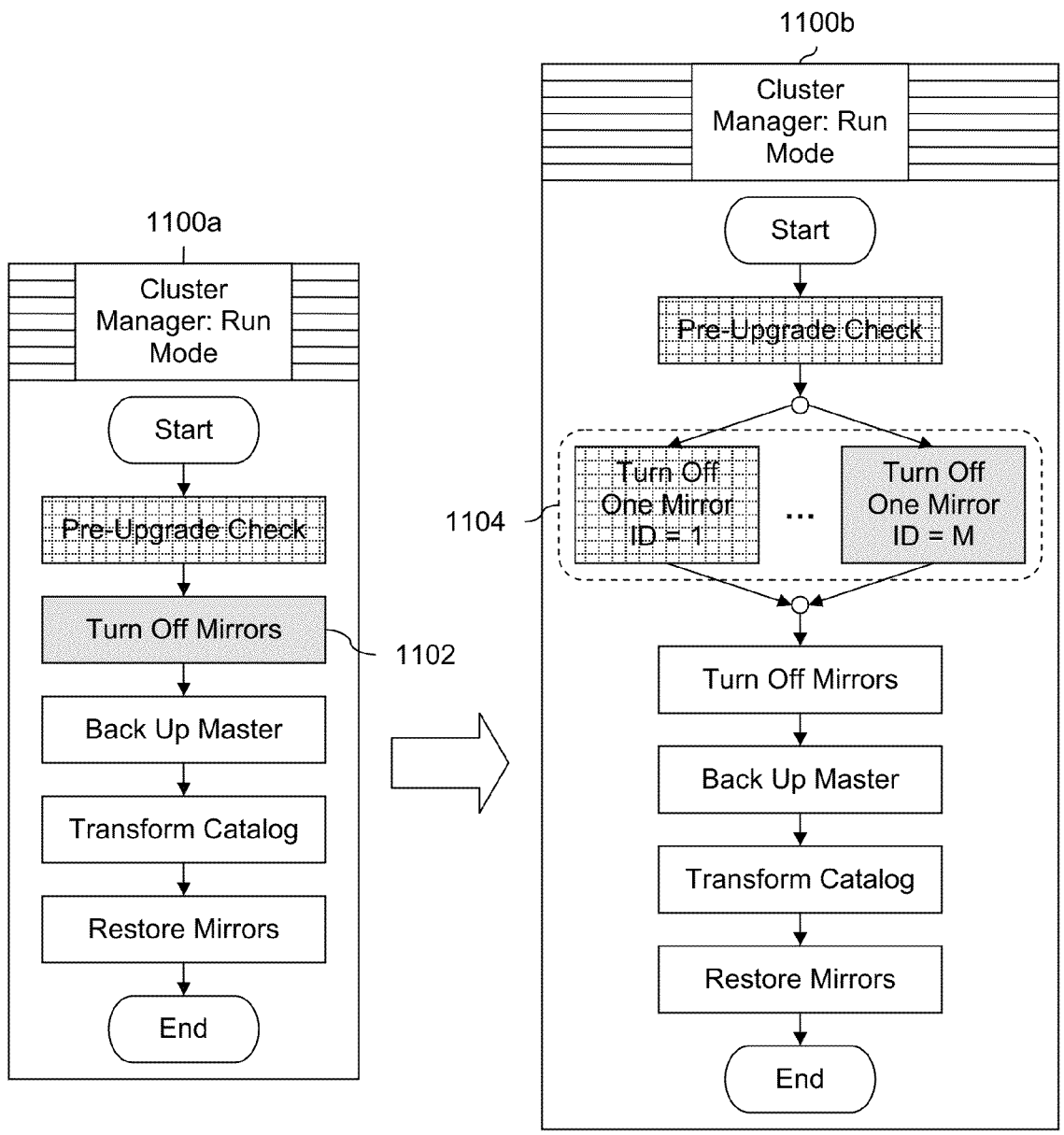
FIG. 11 is a diagram showing an embodiment of a graphical user interface showing parallel sub-operations in an operation that is being performed.

FIG. 11 is a diagram showing an embodiment of a graphical user interface showing parallel sub-operations in an operation that is being performed. In the example shown, the system is in a run mode and an upgrade database operation is being performed. In graphical user interface 1100a, the operation is in the middle of performing turn off mirrors (1102). In response to selecting turn off mirrors 1102 in graphical user interface 1100a (e.g., by double clicking on it), graphical user interface 1100b is presented which shows the parallel operations in turn off mirrors 1102 broken out. In this particular example, the turn off mirror sub-operation for the first mirror has completed and this is indicated by a grid. The turn off mirror sub-operation for the $M^{th}$ mirror has not yet finished and accordingly it is highlighted. In this example, graphical user interfaces 1100a and 1100b are updated in real time.

Figure 12:
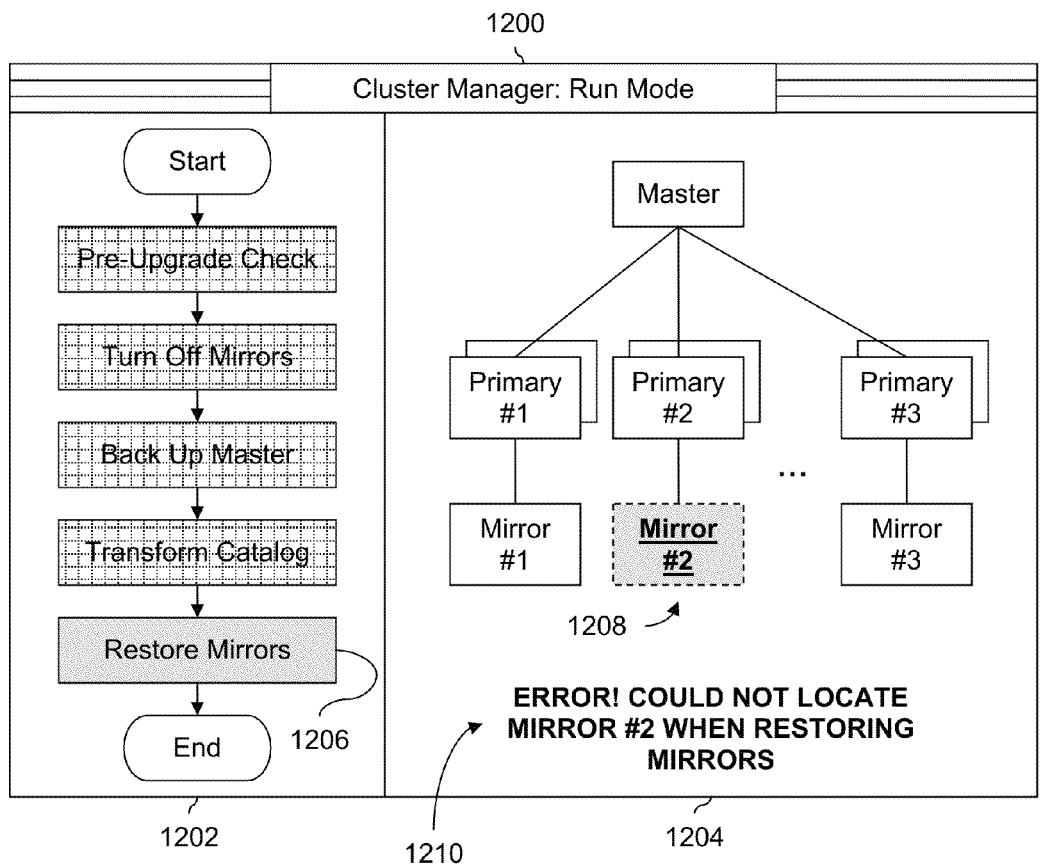
FIG. 12 is a diagram showing an embodiment of a graphical user interface reporting which device caused a failure.

FIG. 12 is a diagram showing an embodiment of a graphical user interface reporting which device caused a failure. In the example shown, an upgrade database operation failed. In flow window 1202, restore mirrors 1206 is highlighted, indicating that the operation failed at that sub-operation. In system window 1204, error message 1210 is displayed which says, "Error! Could not locate Mirror #2 when restoring mirrors." Mirror 2 (1208) is also highlighted in system window 1204, indicating that the problem originated there. In some embodiments, declarative type operations permit a system to know which device an operation fails on, for example because restore mirrors 1206 corresponds to "On All Mirrors, Restore One Mirror" which permits the system to know on which mirror the sub-operation failed. A corresponding imperatively coded operation may not necessarily be able to provide that type of information to a system.

In some embodiments, a user is able to (if desired) further interact with the user interface to further debug the failure. For example, double clicking on mirror 1202 may cause graphical user interface 1200 to present additional information about the mirror which failed (e.g., information from a log recording when the mirror could not be located, suspected or known causes why the mirror could not be located, make/model of the mirror, software version running on the mirror, a user-assigned name of the mirror, post-failure memory dumps of the mirror, etc.).

Figure 13:
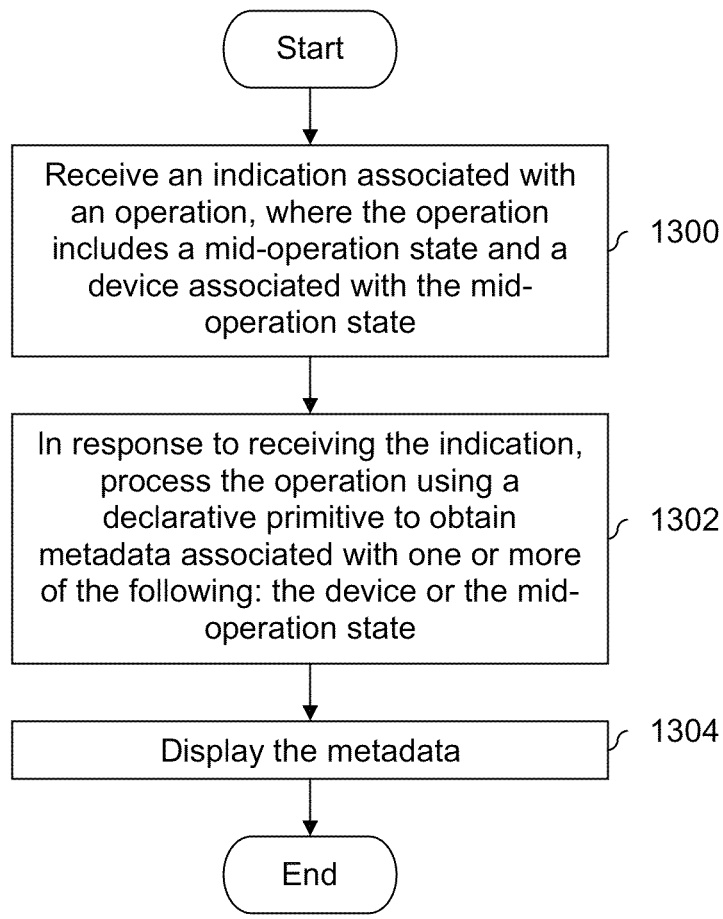
FIG. 13 is a diagram showing an embodiment of a process for displaying information associated with a declarative type operation.

FIG. 13 is a diagram showing an embodiment of a process for displaying information associated with a declarative type operation. In some embodiments, at least some of the steps is/are performed by a cluster management engine on a master in a distributed system.

At 1300, an indication associated with an operation is received, where the operation includes a device and a mid-operation state associated with the device. In various embodiments, the indication received at 1300 is received via a command line interface (see, e.g., FIGS. 4-6) or via a graphical user interface (see, e.g., FIGS. 7-12). Examples of a device included in an operation include one or more of master 100, primaries 108, and/or mirrors 110 in FIG. 1. In FIG. 2, devices are indicated using rounded rectangles and mid-operations states (also referred to as sub-operations) are indicated using rectangles; in some embodiments markup is used to indicate a device and/or mid-operation state in the declarative type code (e.g., in the leaves) of an operation. In various embodiments, the operation is associated with system management (e.g., upgrading a system, starting a system, changing a system setting or parameter, etc.) or with managing information stored on the system (e.g., performing a search on stored data, analyzing stored data, storing new data, etc.).

At 1302, in response to receiving the indication, the operation is processed using a declarative primitive to obtain metadata associated with one or more of the following: the device or the mid-operation state. In some embodiments, an indication is associated with planning, and the operation is not actually performed (see, for example, FIGS. 4 and 7-9). In one example, the operation is parsed to build an internal structure of one or more mid-operation states and associated device(s), without actually causing those devices to enter those mid-operation states. In some embodiments, an indication received at 1302 is associated with performing the operation and 1302 includes performing the operation (see, e.g., FIGS. 5-6 and 10-12).

At 1304, the metadata is displayed. In FIGS. 4-6, for example, the metadata is displayed using a command line interface and in FIGS. 7-12 the metadata is displayed via a graphical user interface. As shown in FIGS. 4-12, a variety of metadata may be displayed, including (but not limited to), planning related metadata, run-time metadata, and failure related metadata.

In some embodiments, a user interface is interactive and a user may obtain further metadata, for example by double clicking on an item in a graphical user interface or entering a command into a command line interface. In some embodiments, after displaying metadata at 1304, the user repeats the process shown in this figure, for example with some other operation (e.g., the user is in a planning stage and wants to review planning information for a first planned operation and then a second planned operation), or the same operation (e.g., an operation failed and the user wants to perform the operation again after making some adjustment to the system). In some embodiments, information displayed at 1304 is saved or logged (e.g., so that it can be reviewed later, if desired, by the user). In various embodiments, a system is configured to automatically log information displayed at 1304, or only after being so instructed by a user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a hardware processor; and
a hardware memory coupled with the hardware processor, wherein the hardware memory is configured to provide the hardware processor with instructions which when executed cause the hardware processor to:
receive a planning indication associated with a declarative type operation prior to receiving a run indication to perform the declarative type operation, wherein:
the declarative type operation is defined using one or more declarative primitives, the declarative primitives describing a sequence of mid-operation states for a target system to progress through when the declarative type operation is performed on the target system and corresponding affected device types in the target systems that are affected by each of the mid-operation states in the sequence,
the affected device types in the target system include one or more of the following storage devices: a master, a primary, and a mirror, and
the target system is operated on using the declarative type operation when the run indication to perform the declarative type operation is received and includes a massively parallel processing (MPP) database that includes at least one master device, at least one primary device, and at least one mirror device;
in response to receiving the planning indication, evaluate the declarative type operation using the declarative primitives against the target system without causing the declarative type operation to be performed on the target system, wherein:
evaluating the declarative type operation includes determining if the target system includes at least one device that would be affected by at least one of the mid-operation states in the sequence based on the declarative primitives; and
in response to determining that the target system includes at least one device that would be affected by the at least one of the mid-operation states in the sequence:
identify, prior to receiving the run indication to perform the declarative type operation, the at least one device that would be affected by the at least one of the mid-operation states in the sequence;
obtain, prior to receiving the run indication to perform the declarative type operation, metadata which includes status information associated with the at least one device that would be affected by the at least one of the mid-operation states in the sequence; and
display, prior to receiving the run indication to perform the declarative type operation, the metadata indicating the status information.

2. The system of claim 1, wherein the metadata is displayed via one or more of the following: a command line interface or a graphical user interface.

3. The system of claim 1, wherein the instructions which when executed further cause the hardware processor to: display an expected amount of processing time associated with the at least one of mid-operation states in the sequence.

4. The system of claim 3, wherein the expected amount of processing time is obtained from one or more of the following: from previously performing the operation on the target system or from performing the operation on a system other than the target system.

5. The system of claim 3, wherein evaluating the declarative type operation further include:
analyzing the target system; and
selecting, from a plurality of stored values obtained from performing the declarative type operation on a plurality of systems other than the target system, the expected amount of processing time, wherein selecting is based at least in part on which system in the plurality of other systems is closest to the target system.

6. The system of claim 1, wherein the instructions which when executed further cause the hardware processor to:
receive the run indication associated with the declarative type operation; and
in response to receiving the run indication, perform the declarative type operation on the target system, causing the target system to enter the at least one of the mid-operation states in the sequence.

7. The system of claim 6, wherein the instructions which when executed further cause the hardware processor to: display, in real-time, a current mid-operation state in the sequence.

8. The system of claim 6, wherein the instructions which when executed further cause the hardware processor to: display, in real-time, one or more currently affected devices associated with a current mid-operation state in the sequence.

9. The system of claim 6, wherein the instructions which when executed further cause the hardware processor to: in the event a failure occurs, indicating one or more of the following: a mid-operation state in the sequence during which the failure occurred or one or more devices associated with the failure.

10. A method, comprising:
receiving, by a processor, a planning indication associated with a declarative type operation prior to receiving a run indication to perform the declarative type operation, wherein:
the declarative type operation is defined using one or more declarative primitives, the declarative primitives describing a sequence of mid-operation states for a target system to progress through when the declarative type operation is performed on the target system and corresponding affected device types in the target systems that are affected by each of the mid-operation states in the sequence,
the affected device types in the target system include one or more of the following storage devices: a master, a primary, and a mirror, and
the target system is operated on using the declarative type operation when the run indication to perform the declarative type operation is received and includes a massively parallel processing (MPP) database that includes at least one master device, at least one primary device, and at least one mirror device;
in response to receiving the planning indication, evaluating the declarative type operation using the declarative primitives against the target system without causing the declarative type operation to be performed on the target system, wherein:
evaluating the declarative type operation includes determining if the target system includes at least one device that would be affected by at least one of the mid-operation states in the sequence based on the declarative primitives; and
in response to determining that the target system includes at least one device that would be affected by the at least one of the mid-operation states in the sequence:
identifying, prior to receiving run indication to perform the declarative type operation, the at least one device that would be affected by the at least one of the mid-operation states in the sequence;
obtaining, prior to receiving run indication to perform the declarative type operation, metadata which includes status information associated with the at least one device that would be affected by the at least one of the mid-operation states in the sequence; and
displaying, prior to receiving run indication to perform the declarative type operation, the metadata indicating the status information.

11. The method of claim 10, wherein displaying further includes displaying an expected amount of processing time associated with the mid-operation state in the sequence.

12. The method of claim 11, wherein the expected amount of processing time is obtained from one or more of the following: from previously performing the operation on a target system or from performing the operation on a system other than the target system.

13. The method of claim 11, wherein evaluating the declarative type operation further includes:
analyzing the target system; and
selecting, from a plurality of stored values obtained from performing the declarative type operation on a plurality of systems other than the target system, the expected amount of processing time, wherein selecting is based at least in part on which system in the plurality of other systems is closest to the target system.

14. A computer program product, where the computer program product includes a non-transitory computer readable storage medium with computer instructions which when executed cause the hardware processor to:
receive a planning indication associated with a declarative type operation prior to receiving a run indication to perform the declarative type operation, wherein:
the declarative type operation is defined using one or more declarative primitives, the declarative primitives describing a sequence of mid-operation states for a target system to progress through when the declarative type operation is performed on the target system and corresponding affected device types in the target systems that are affected by each of the mid-operation states in the sequence,
the affected device types in the target system include one or more of the following storage devices: a master, a primary, and a mirror, and
the target system is operated on using the declarative type operation when the run indication to perform the declarative type operation is received and includes a massively parallel processing (MPP) database that includes at least one master device, at least one primary device, and at least one mirror device;
in response to receiving the planning indication, evaluate the declarative type operation using the declarative primitives against the target system without causing the declarative type operation to be performed on the target system, wherein:
evaluating the declarative type operation includes determining if the target system includes at least one device that would be affected by at least one of the mid-operation states in the sequence based on the declarative primitives; and
in response to determining that the target system includes at least one device that, would be affected by the at least one of the mid-operation states in the sequence:
identify, prior to receiving the run indication to perform the declarative type operation, the at least one device that would be affected by the at least one of the mid-operation states in the sequence;
obtain, prior to receiving the run indication to perform the declarative type operation, metadata which includes status information associated with the at least one device that would be affected by the at least one of the mid-operation states in the sequence; and
display, prior to receiving the run indication to perform the declarative type operation, the metadata indicating the status information.

15. The computer program product of claim 14, wherein the computer instructions which when executed cause further the hardware processor to
receive the run indication associated with the declarative type operation; and
in response to receiving the run indication, perform the declarative type operation on the target system, causing the target system to enter the at least one of the mid-operation states in the sequence.

16. The computer program product of claim 15, wherein the computer instructions which when executed cause further the hardware processor to: display in real-time, a current mid-operation state in the sequence.

17. The computer program product of claim 15, wherein the computer instructions which when executed cause further the hardware processor to: display, in real-time, one or more currently affected devices associated with a current mid-operation state in the sequence.

18. The computer program product of claim 15, wherein the computer instructions which when executed further cause the hardware processor to: in the event a failure occurs, indicating one or more of the following: a mid-operation state in the sequence during which the failure occurred or one or more devices associated with the failure.

\* \* \* \* \*